US008812723B2

(12) United States Patent
Lambert et al.

(10) Patent No.: US 8,812,723 B2
(45) Date of Patent: Aug. 19, 2014

(54) ASSIGNMENT OF NETWORK ADDRESSES

(75) Inventors: Paul A. Lambert, Mountain View, CA (US); Frank Huang, Pleasanton, CA (US)

(73) Assignee: Marvell World Trade Ltd., St. Michael (BB)

( * ) Notice: Subject to any disclaimer, the term of this patent is extended or adjusted under 35 U.S.C. 154(b) by 229 days.

(21) Appl. No.: 13/269,441

(22) Filed: Oct. 7, 2011

(65) Prior Publication Data

US 2012/0096138 A1  Apr. 19, 2012

Related U.S. Application Data

(60) Provisional application No. 61/393,814, filed on Oct. 15, 2010, provisional application No. 61/405,574, filed on Oct. 21, 2010.

(51) Int. Cl.
*G06F 15/16* (2006.01)

(52) U.S. Cl.
USPC ............................ 709/233; 370/352; 370/401

(58) Field of Classification Search
USPC .................................. 709/223; 370/352, 401
See application file for complete search history.

(56) References Cited

U.S. PATENT DOCUMENTS

| 7,660,258 | B2 | 2/2010 | Cho et al. | |
|---|---|---|---|---|
| 7,793,005 | B1 * | 9/2010 | Fernald et al. | 710/3 |
| 8,006,276 | B2 | 8/2011 | Nakagawa et al. | |
| 8,036,520 | B2 | 10/2011 | Narukawa et al. | |
| 8,095,671 | B2 | 1/2012 | Balogh | |
| 8,102,826 | B2 | 1/2012 | Lee | |
| 8,364,831 | B2 | 1/2013 | Balogh | |
| 8,392,850 | B2 | 3/2013 | Nakagawa et al. | |
| 8,451,862 | B2 | 5/2013 | Huang et al. | |
| 2001/0003191 | A1 | 6/2001 | Kovacs et al. | |
| 2004/0240474 | A1 | 12/2004 | Fan | |
| 2005/0188069 | A1 | 8/2005 | Mohandas | |
| 2006/0256717 | A1 * | 11/2006 | Caci | 370/229 |
| 2007/0204021 | A1 | 8/2007 | Ekl et al. | |
| 2010/0054154 | A1 | 3/2010 | Lambert et al. | |
| 2010/0067509 | A1 | 3/2010 | Lambert | |

FOREIGN PATENT DOCUMENTS

WO    2010083887        7/2010
WO    WO2010083887 A1  7/2010

OTHER PUBLICATIONS

Johnson, et al., "Subnet Allocation Option" Internet Engineering Task Force, Internet Society (ISOC), May 13, 2010, pp. 1-30.
Mohsin et al., "IP address assignment in a mobile ad hoc network", IEEE Military Communications Conference, Oct. 7, 2002, pp. 856-861.
Rummery, Audrey, Authorized Officer, European Patent Office, International Search Report for related PCT Application No. PCT/US2011/055476, Apr. 2, 2012, 12 pages.

(Continued)

Primary Examiner — Yves Dalencourt

(57) ABSTRACT

A technique relating to hierarchical address assignment in ad hoc networks includes receiving, by a device of an ad hoc network, a request to register in the ad hoc network from an enrollee device. The devices can be wireless mobile devices, and the ad hoc network can be an independent basic service set (IBSS) network. The method also includes responding to the enrollee with information representing (i) an address for the enrollee device, and (ii) a finite quantity of addresses to be assigned to future enrollee devices.

10 Claims, 9 Drawing Sheets

(56) References Cited

OTHER PUBLICATIONS

Chen et al., "Scalable Address Allocation Protocol for Mobile Ad Hoc Networks," 2009, Fifth International Conference on Mobile Ad-hoc and Sensor Networks, IEEE Computer Society, 41-48, 8 pages.

IBSS with Wi-Fi Protected Setup Technical Specification v.1.0.0, Wi-Fi Alliance Technical Committee IBSS with Wi-Fi Protected Setup Technical Task Group, 2012, 76 pages.

* cited by examiner

ASSIGNMENT OF NETWORK ADDRESSES

CROSS REFERENCE TO RELATED APPLICATION

This disclosure claims the benefit of the priority of U.S. Provisional Application No. 61/405,574, filed on Oct. 21, 2010, and of U.S. Provisional Application No. 61/393,814, filed on Oct. 15, 2010, both of which are incorporated herein by reference in their entirety.

BACKGROUND

The present disclosure describes technologies relating generally to assignment of network addresses, and more specifically to hierarchical address assignment in mobile, wireless ad hoc networks.

Two or more mobile devices can communicate with each other as wireless clients of a wireless network. Examples of such mobile devices are laptop or tablet computers, smartphones, personal digital assistants (PDAs), digital cameras, child monitoring devices, and the like. A wireless network is said to operate in infrastructure mode if communications of the two or more wireless clients are bridged through a wireless access point. The wireless network is said to operate in ad hoc mode if the two or more mobile devices communicate with each other directly, without the use of a wireless access point. The ad hoc mode is also commonly referred to as a wireless peer-to-peer (P2P) mode. Wireless clients in ad hoc mode form an independent basic service set (IBSS). In this specification, a wireless network operating in ad hoc mode and including mobile devices is referred to, interchangeably, as an ad hoc network, an IBSS network, or a wireless P2P network.

In some IBSS networks, one of the wireless clients, e.g., a mobile device that was the first wireless member in a given IBSS network, can periodically beacon to identify the given IBSS network, and can authenticate new members. Hence, this wireless client acts as a Dynamic Host Configuration Protocol (DHCP) server that assigns addresses to the new members, such that the assigned addresses are not conflicting. To join the given IBSS network, a mobile device would locate the wireless client that acts as the DHCP server to obtain an address on the given IBSS network.

In other IBSS networks known as zero configuration networks, to join the network a mobile device selects a candidate address, e.g., an address within a reserved range of addresses, and uses Address Resolution Protocol (ARP) probes to ascertain that the candidate address is not in use on the network. The addressing approach used in zero configuration networks is referred to as link-local addressing, and requires multicast transmissions that should, ideally, reach all members of the IBSS network. Should a mobile device joining a zero configuration network determine that a selected candidate address is already in use within the zero configuration network, a new candidate address is selected by the mobile device.

SUMMARY

The present disclosure describes systems and techniques for assigning network addresses, e.g., for hierarchically assigning addresses in mobile, wireless ad hoc networks.

According to an aspect of the present disclosure, a method includes requesting, by a device that is not a member of an ad hoc network from a given device that is a member of the ad hoc network, to join the ad hoc network. The method further includes receiving, from the given device, a response including information representing (i) an address for the requesting device, and (ii) a finite quantity of addresses to be assigned to future requesting devices. In addition, the method includes designating a portion of the finite quantity of addresses from which the device will assign addresses to future requesting devices.

Implementations can include one or more of the following features. In some implementations, the received response can include the address for the requesting device assigned by the given device, and information representing multiple subsets of addresses. Each one of the multiple subsets can include a predefined quantity of addresses to be assigned to future requesting devices. Additionally, the designated portion of the finite quantity of addresses from which the device will assign addresses to future requesting devices can be one of the multiple subsets. For example, the addresses received from the given device can be internet protocol version 4 (or 6) IPv4 (or IPv6) addresses. Moreover, for each of the multiple subsets, the predefined quantity of addresses to be assigned to future requesting devices can be represented by a bit mask having a quantity of bits equal to a quantity of bits of an IPv4 address, such that binary one values of the bit mask define fixed bits of the predefined quantity of IPv4 addresses, and binary zero values of the bit mask define bits that are part of a range assignment of the predefined quantity of IPv4 addresses.

In some implementations, the method can include self-assigning the address for the requesting device based on the information representing the finite quantity of addresses to be assigned to future requesting devices, and informing the given device of the self-assigned address. In some cases, the response received from the given device further can include an address of the given device. In other cases, the response received from the given device can further include a subnet mask associated with the ad hoc network. In some implementations, the method can include randomly selecting from multiple devices, by the device that is not a member of the ad hoc network, the given device of the ad hoc network from which to request to join the ad hoc network. In some implementations, the method can include selecting from multiple devices, by the device that is not a member of the ad hoc network and based on predefined criteria, the given device of the ad hoc network from which to request to join the ad hoc network.

According to another aspect of the present disclosure, a method includes receiving, by a device of an independent basic service set (IBSS) network, a request to register in the IBSS network from an enrollee device. The method also includes responding to the enrollee with information representing (i) an address for the enrollee device, and (ii) a finite quantity of addresses to be assigned to future enrollee devices.

Implementations can include one or more of the following features. In some implementations, responding to the enrollee can include assigning, by the given device, the address for the enrollee, and providing the assigned address for the enrollee and information representing multiple subsets of addresses. Each one of the multiple subsets can include a predefined quantity of addresses to be assigned to future enrollees. For example, addresses from the multiple subsets of addresses can be internet protocol version 4 (or 6) IPv4 (or IPv6) addresses. For each of the multiple subsets of addresses, the predefined quantity of addresses to be assigned to future enrollee devices can be represented by a bit mask having a quantity of bits equal to a quantity of bits of an IPv4 address. For example, binary one values of the bit mask can define fixed bits of the predefined quantity of IPv4 addresses, and binary zero values of the bit mask can define bits that are part of a range assignment of the predefined quantity of IPv4 addresses.

In some implementations, assigning the address for the enrollee device can include determining, by the device, that there is at least one available address in a subset of addresses from among the multiple subsets that was designated by the device to assign, by the device, addresses to future enrollee devices, and in response to determining that there is at least one available address in the designated subset, assigning, by the device, the address for the enrollee device from the designated subset. Further, providing the assigned address for the enrollee and information representing multiple subset of addresses can include determining, by the device, that there is at least one subset of addresses from among the multiple subsets from which to assign addresses to future enrollee devices, in addition to the designated subset, and transmitting, by the device, a response to the enrollee device including (i) the address assigned by the device for the enrollee device, and (ii) the at least one additional finite subset.

In some implementations, the method can include receiving a notification from the enrollee device including the self-assigned address of the enrollee device.

According to another aspect of the present disclosure, a device includes a hardware processor, and a memory storing instructions that when executed by the hardware processor causes the device to perform operations including communicating with one or more mobile devices as members of an ad hoc network. The operations further include receiving a request to join the ad hoc network from a device that is not a member of the ad hoc network. Furthermore, the operations include, in response to the request, determining whether there is at least one unassigned address in a finite subset of addresses that was designated by the mobile device to assign, by the mobile device, addresses to future requesting devices. The operations also include, in response to determining that there is at least one unassigned address in the designated finite subset, assigning an unassigned address for the requesting device from the designated finite set of addresses. In addition, the operations include determining whether there is at least one finite subset of addresses from which to assign addresses to future requesting devices, in addition to the designated finite subset. The operations further include, in response to determining that there is at least one additional finite subset of addresses, transmitting a response to the requesting device including the address assigned by the device for the requesting device, and information representing the at least one additional finite subset. Furthermore, the operations include, in response to determining that there is no additional finite subset, transmitting a response to the requesting device including the address assigned by the device for the requesting device. Additionally, the operations include, in response to determining that there is no unassigned address in the designated finite subset, not accepting the request.

Implementations can include one or more of the following features. In some implementations, addresses from the finite subsets of addresses can be internet protocol version 4 (or 6) IPv4 (or IPv6) addresses. In addition, each one of the finite subsets of addresses can be represented by a bit mask having a quantity of bits equal to a quantity of bits of an IPv4 address. For instance, binary one values of the bit mask can define fixed bits of the IPv4 addresses of the one finite subset, and binary zero values of the bit mask can define bits that are part of a range assignment of the IPv4 addresses of the one finite subset. In some implementations, the response transmitted to the requesting device further can include an address of the mobile device. In some implementations, the response transmitted to the requesting device further can include a subnet mask associated with the ad hoc network.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor, a central processing unit, etc.) to perform operations described. Thus, program implementations can be realized from a disclosed method, system, or apparatus and apparatus implementations can be realized from a disclosed system, computer-readable medium, or method. Similarly, method implementations can be realized from a disclosed system, computer-readable medium, or apparatus and system implementations can be realized from a disclosed method, computer-readable medium, or apparatus. For example, one or more disclosed implementations can be configured in various systems and apparatus, including, but not limited to, mobile data processing apparatuses (e.g., wireless clients, cellular telephones, smartphones, PDAs, mobile computers, digital cameras), or combinations of these.

Implementations of the subject matter described in this specification can be configured so as to realize one or more of the following potential advantages. A member of an IBSS network that uses the disclosed systems and techniques can act as a registrar to provide an address to an enrollee device that is different from any of the current and future addresses of the IBSS network. In this fashion, addressing conflicts, such as two network members having the same address, can be avoided within the IBSS network. In addition to registering enrollee devices as new members of the IBSS network, a registrar member can enable, by using the disclosed technologies, the new network members to act as registrars that can enroll future members of the IBSS network.

Details of one or more implementations are set forth in the accompanying drawings and the description below. Other features and advantages may be apparent from the description and drawings, and from the claims.

DRAWING DESCRIPTIONS

Like reference symbols in the various drawings indicate like elements.

DETAILED DESCRIPTION

Figure 1A:
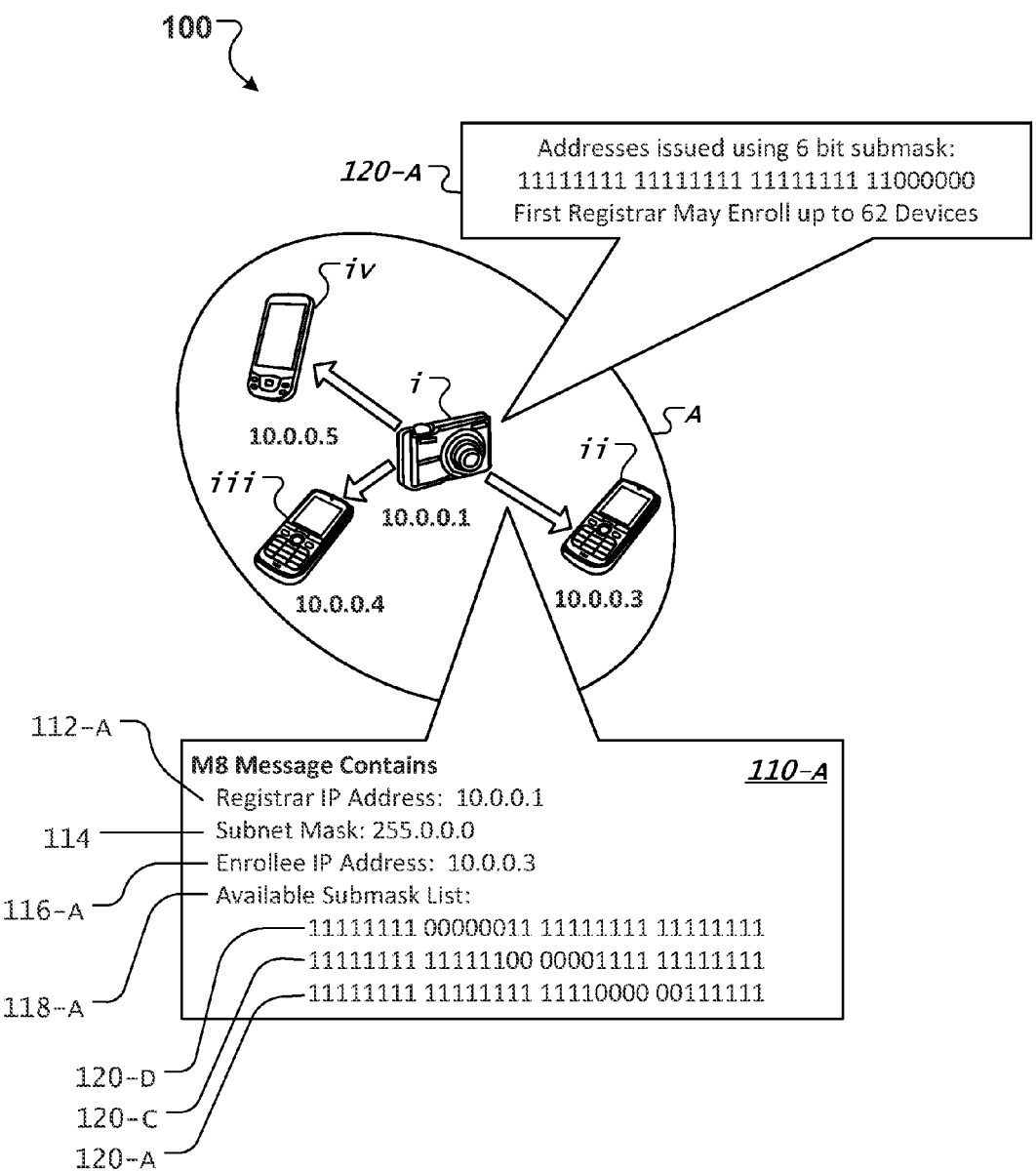
FIGS. 1A-1D show aspects of technology used to generate a mobile, wireless ad hoc network.

To become a member of an ad hoc network, a device obtains an address associated with the ad hoc network. The address of the device is associated with the ad hoc network either i) if the address is assigned, by a network member, for the device, or ii) if the address for the device is self-assigned and communicated to at least one network member. The device can be a mobile device, and the ad hoc network can be a mobile, wireless network, e.g., an IBSS network.

For example, a group of classmates go to a stadium. They take pictures and notes using cell phones with camera functionality and input functionality. As each member of the group would like to share the pictures and notes only with other classmates, they establish a secured ad hoc network, e.g., by using personal identification number (PIN) validation. The systems and techniques described in this specification can be used to enroll a mobile device that belongs to a classmate who wishes to join the established secured ad hoc network at a later time.

FIGS. 1A-1D show aspects of technology used to generate a mobile, wireless ad hoc network 100. Examples of mobile devices that can be members of the ad hoc network 100 are cellular telephones, smartphones, PDAs, mobile computers, digital cameras, media players or combinations of these. In this specification, the mobile devices can be identified using roman numerals. An identifier of a mobile device can be a media access control (MAC) address associated with the mobile device. For example, the mobile device "i" has a MAC address=i; the mobile device "iv" has a MAC address=iv; etc.

Prior to the formation of the ad hoc network 100, the mobile devices can alternate between acting as enrollees (e.g., scanning for an ad hoc network) and acting as registrars (e.g., announcing formation of their respective base networks; a "base" network is a "network" that has one member.) When acting as enrollees, the mobile devices can scan for other devices acting as registrars of existing networks. In the examples illustrated in FIG. 1A, the mobile device "i", acting as an enrollee, can detect messages from the mobile devices "ii", "iii" and "iv" indicating that they can act as registrars of their respective base networks. If enrollees receive such messages from registrars during a first predetermined duration, the registration protocol can begin. If, however, the enrollees detect no messages from registrars during the first predetermined period, the mobile devices are configured to switch to acting as registrars. When acting as registrars, the mobile devices, which are not members of an ad hoc network, can create their respective base networks and can advertise the created base networks. In the examples illustrated in FIG. 1A, the mobile device "i", acting as a registrar, can create a base network, and can wait for probe requests from other mobile devices to join its newly created base network. The mobile devices are configured to act as registrars of their base networks for a second predetermined duration, and then to switch to acting as enrollees, as described above. If, however, the registrars receive requests to join the base networks from enrollees during the second predetermined duration, the registration protocol can begin.

In the examples illustrated in FIG. 1A, the mobile device "i", acting as the registrar of its base network 100, can assign itself and other mobile devices that may enroll into the base network 100 addresses corresponding to a private subnet. For instance, an internet protocol version 4 (IPv4) address has 32 bits. The IPv4 subnet mask 114 can be 255.0.0.0. This IPv4 subnet mask has 24 bits and can also be denoted as 10.0.0.0/24. Hence, the base network 100 can become an ad hoc network 100 with up to 16,777,216 members, corresponding to a set of $2^{24}$ addresses associated with the subnet mask 114. An address 112-A assigned by the registrar member "i" to itself, also known as the starting address, can be the lowest address in the private subnet, IPi=10.0.0.1. Other starting addresses and subnet masks can be chosen as part of the systems and techniques described in this specification. Although the technologies disclosed in this specification are described, in connection with FIGS. 1A-1D and 4, in the context of IPv4 addresses, the disclosed systems and techniques also can be used to hierarchically assign internet protocol version 6 (IPv6) addresses in ad hoc networks.

The registrar "i" can maintain a bit mask 120-A that defines a subset of addresses that it can assign to enrollees. The subset of addresses associated with the bit mask 120-A is part of the set of $2^{24}$ addresses associated with the subnet mask 114. In this specification, a bit mask is also referred to interchangeably as a submask. A submask maintained by a registrar can be constructed in a similar manner to a subnet mask. For example, binary one values of a submask represent fixed bits, and binary zero values of the submask define bits that are part of a range of addresses available for assignment by the registrar that maintains the submask. In the examples illustrated in FIG. 1A, the registrar "i" maintains a 6-bit submask 120-A given by "11111111 11111111 11111111 11000000", that has 6 zero bits in the bit-range from 1-6. The self-assigned IP address 112-A, IPi=10.0.0.1, corresponds to the bit value IPi="00000101 00000000 00000000 00000001", which is a bit value within the submask 120-A. (The bit-range 1-6 of the bit value corresponds to the address range associated with the submask 120-A.)

In general, the submasks maintained by registrars of an ad hoc network can be established based on a number of enrollees than would be registered by a single registrar. A quantity of addresses in a subset of addresses associated with an N-bit submask is $2^N-1$, where N is the number of binary zero values in the submask. So in FIG. 1A, for N=6, the registrar "i" can assign 63 addresses. As the first one of the 63 addresses is self-assigned, the registrar "i" can register 62 enrollees. The number N of binary zero values in a submask, also determines a number M of different submasks that can be defined for an ad hoc network. For instance, there can be M=24/N different submasks, when a 24 bit subnet mask 10.0.0.0/24 is used, and N is a divisor of 24. Hence, combinations of two 12-bit submasks, three 8-bit submasks, four 6-bit submasks, . . . can be used for address assignment in various ad hoc networks.

As described above, one of the M submasks can be maintained locally at the registrar. Additionally, the registrar can provide the remaining M−1 submasks to its $2^N-1$ enrollees. In this manner, an enrollee can receive from the registrar an address assigned by the registrar, and M−1 masks other than the one mask that is locally maintained at the registrar. This represents a first tier hierarchical address assignment. By receiving the assigned address from the registrar, the enrollee becomes a new member of the ad hoc network. The new member of the ad hoc network can designate one of the received M−1 submasks to define a subset of IP addresses that the new member can assign, when acting as a registrar, to future enrollees. Moreover, the new member of the ad hoc network, acting as a registrar, can provide to future enrollees, along with an assigned address, the remaining M−2 submasks other than the designated submask. This represents a second tier hierarchical address assignment. In this fashion, a hierarchical address assignment based on available submasks provided by registrars to enrollees can partition the available address space of the ad hoc network. The hierarchical address assignment has the form of a tree having M levels, with each node of each level having $2^N-1$ branches. A hierarchy level corresponds to a tier of hierarchical address assignment. At the $(M-1)^{th}$ tier of hierarchical address assignment, the number of remaining submasks other than the designated submask to be provided by registrars to enrollees is zero. At this (before last) tier, a registrar may provide to its enrollees an assigned IP address without providing a submask for defining a subset of IP addresses to future enrollees. Therefore, devices that enroll at the $M^{th}$ (and last) tier cannot act as registrars of the ad hoc network.

FIG. 1A shows an example of a first tier hierarchical address assignment. As described above, the device "i", acting as registrar, has self-assigned the starting address 112-A to form a base ad hoc network 100. In this case, N=6 and M=4, and hence, the registrar "i" has generated four different 6-bit submasks that can be used to assign the $2^{24}$ addresses in the subnet 10.0.0.0/24. In addition to the 6-bit submask 120-A maintained by the registrar "i" as described above, the registrar "i" can provide to future enrollees a list 118-A of available submasks including a 6-bit submask 120-B given by "11111111 11111111 11110000 00111111", that has 6 zero bits in the bit-range from 7-12; a 6-bit submask 120-C given by "11111111 11111100 00001111 11111111", that has 6 zero bits in the bit-range from 13-18; and a 6-bit submask 120-D given by "11111111 00000011 11111111 11111111", that has 6 zero bits in the bit-range from 19-24.

Upon receipt of a request from the mobile device "ii" to enroll in the base network 100, the registrar "i" can assign an address for the enrollee 116-A, based on the 6-bit submask 120-A. In this case, the assigned address is IPii=10.0.0.3, which corresponds to the bit value IPii="00000101 00000000 00000000 00000011", which is a bit value within the submask 120-A. (The bit-range 1-6 of the bit value corresponds to the address range associated with the submask 120-A.) Subsequently, the registrar "i" can transmit a response 110-A to the enrollee "ii". The response 110-A can be sent with one of the messages associated with the Wi-Fi simple configuration (WSC) registration protocol. For example, the eight message (M8) of the WSC can be used to transmit the response 110-A from the registrar "i" to the enrollee "ii". The response 110-A can include the registrar's address 112-A, in this case IPi=10.0.0.1. Further, the response 110-A can include the subnet mask 114 used by the base network 100, in this case 255.0.0.0. Furthermore, the response 110-A includes the enrollee's address 116-A, as assigned by the registrar "i", in this case IPii=10.0.0.3. Additionally, the response 110-A includes a list 118-A of available submasks, in this case including the submasks 120-B, 120-C and 120-D.

Once the base network 100 contains more than one network member, it becomes an ad hoc network 100. Members of an ad hoc network don't need to switch between registrar and enrollee modes. From now on, both devices "i" and device "ii" take up the registrar role to perform registrations of future network members. For example, the registrar "i" can register 61 other enrollees (e.g., "iii", "iv", "v", . . . ) into the ad hoc network 100 by performing the first tier hierarchical address assignment as described above in reference to the enrolment of device "ii". The registrar "i" can continue to register new network members until all 62 addresses in the subset of addresses associated with the 6-bit submask 120-A are assigned to enrollees. In some implementations, future requests to the device "i" from other enrollees can be ignored once the finite quantity of addresses of the subset of addresses associated with the 6-bit submask 120-A has been assigned. In other implementations, after no more addresses associated with the 6-bit submask 120-A are available for assignment, the device "i" can turn off the registrar mode to become invisible to devices outside of the ad hoc network 100 which attempt to enroll into the ad hoc network 100. In addition, the 62 enrollees, which can join the ad hoc network via the first tier hierarchical address assignment performed by the registrar "i", are part of a subnet "A" corresponding to a first hierarchical level of the ad hoc network 100.

In addition, the registrar "ii" (and the other enrollees of registrar "i") can register other future enrollees into the ad hoc network 100 by performing a second tier hierarchical address assignment as described below in connection with FIG. 1B.

Figure 1B:
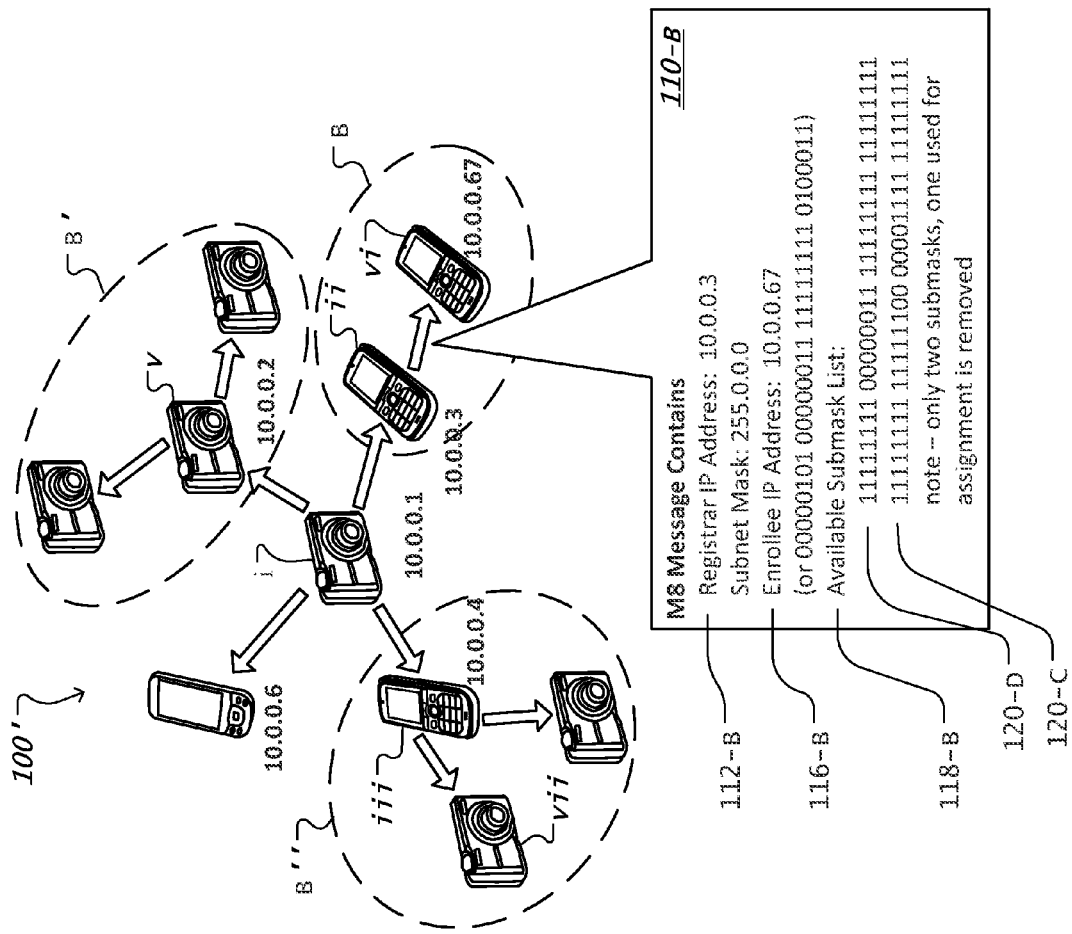

FIG. 1B shows an example of a second tier hierarchical address assignment. The new network member "ii" having an address 112-B can designate the 6-bit submask 120-B to define a subset of addresses that it can assign to future enrollees. Further, the network member "ii" can remove the 6-bit submask 120-B from the list 118-A of available submasks received from the registrar "i". Accordingly, when acting as a registrar, the network member "ii" can provide to future enrollees a list 118-B of available submasks including the 6-bit submask 120-C and the 6-bit submask 120-D.

A device "vi" that is not a member of an instance 100' of the ad hoc network (from here on referred to as the ad hoc network 100'), can detect the ad hoc network 100'. As part of this detection, the mobile device "vi" can detect respective signals from any of the network members "i", "ii", "iii", "iv", "v", . . . to indicate that these devices can act as registrars to enroll the mobile device "vi" into the ad hoc network 100'. The enrollee device "vi" can select one of the registrars with which to communicate about joining the ad hoc network 100'. In some implementations, the enrollee device "vi" can randomly select the registrar member. In other implementations, the selection of the registrar member by the enrollee device "vi" can be based on predefined criteria. One such selection criterion can be an order in which the enrollee device "vi" discovers the network members. For example, the network member chosen by the enrollee device "vi" to be the registrar is the network member that was discovered first. Another such selection criterion can be strength of signals received from the network members by the enrollee device "vi". For example, the network member chosen by the enrollee device "vi" to be the registrar is the network member associated with the strongest signal received by the enrollee device "vi" from among signals emitted by the network members "i", "ii", "iii", "iv", "v", . . . . In this case, the enrollee "vi" can select the registrar "ii" from which to request enrollment into the ad hoc network 100'. Another such selection criterion can be additional information carried by signals received from the network members by the enrollee device "vi". For example, such additional information can include a number of addresses a registrar has to assign. As such, the network member chosen by the enrollee device "vi" to be the registrar can be the network member having the largest current number of available addresses. In this case, the enrollee "vi" can select the registrar "ii" from which to request enrollment into the ad hoc network 100'.

Upon receipt of a request from the enrollee "vi" to enroll in the ad hoc network 100', the registrar "ii" can assign an address 116-B for the enrollee "vi", based on the designated 6-bit submask 120-B. In this case, the assigned address is IPvi=10.0.0.67, which corresponds to the bit value IPvi="00000101 00000000 00000000 01000011", which is a bit value within the submask 120-B. (The bit-range 7-12 of the bit value corresponds to the address range associated with the submask 120-B.) Subsequently, the registrar "ii" can transmit a response 110-B to the enrollee "vi". The response 110-B can be in the form of an M8 message in accordance with the WSC protocol. The response 110-B includes the registrar's address 112-B, in this case IPii=10.0.0.3. Further, the response 110-B includes the subnet mask used by the ad hoc network 100', in this case 255.0.0.0. Furthermore, the response 110-B includes the enrollee's address 116-B, in this case IPvi=10.0.0.67, as assigned by the registrar "ii". Additionally, the response 110-B includes a list 118-B of available submasks, in this case including the submasks 120-C and 120-D.

From now on, the device "vi" also can take up the registrar role to perform registrations of future network members. Moreover, the registrar "vi" (and the other enrollees of registrars "ii", "iii", "v") can register other future enrollees into the ad hoc network 100' by performing a third tier hierarchical address assignment as described below in connection with FIG. 1C. The device "ii" can continue to register other enrollees into the ad hoc network 100' by performing the second tier hierarchical address assignment as described above in reference to the enrolment of the device "vi". The registrar "ii" can register new network members until all 63 addresses in the subset of addresses associated with the 6-bit submask 120-B are assigned to new enrollees. In addition, the 63 enrollees which can join the ad hoc network 100' via the second tier hierarchical address assignment performed by the registrar "ii" are part of a subnet "B" corresponding to a second hierarchical level of the ad hoc network 100'. Similarly, enrollees (e.g., device "vii") which may join the ad hoc network 100' via the second tier hierarchical address assignment performed by the registrar "iii" are part of another subnet "B'" corresponding to the same second hierarchical level of the ad hoc network 100'. Also, enrollees which may join the ad hoc network 100' via the second tier hierarchical address assignment performed by the registrar "v" are part of yet another subnet "B'''" corresponding to the same second hierarchical level of the ad hoc network 100'. There may be 62 subnets B, B', B", . . . at the second hierarchical level of the ad hoc network 100', one for each of the 62 network members that may be part of the subnet A.

Figure 1C:
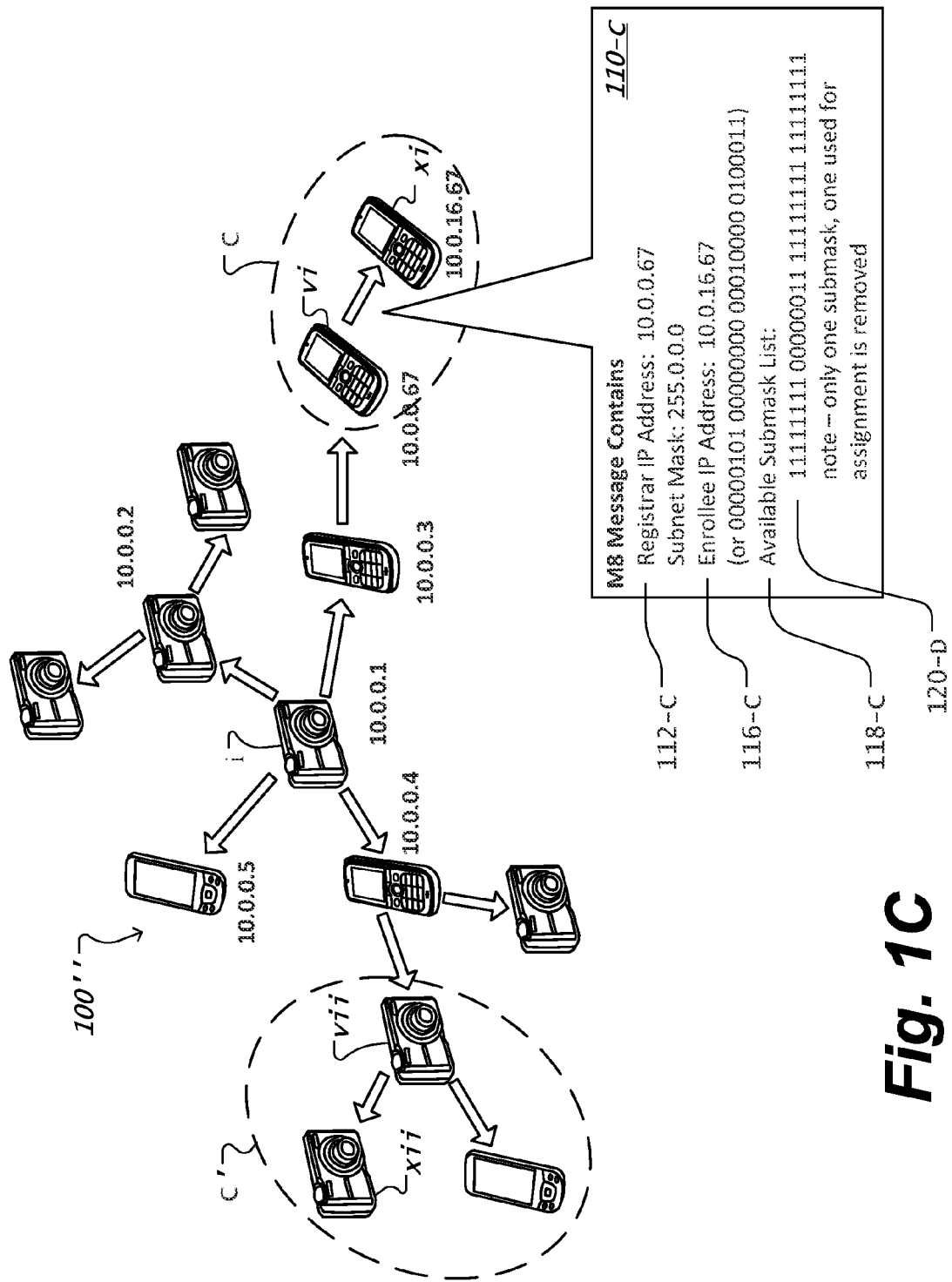

FIG. 1C shows an example of a third tier hierarchical address assignment. The new network member "vi" having an address 112-C can designate the 6-bit submask 120-C to define a subset of addresses that it can assign to future enrollees. Further, the network member "vi" can remove the 6-bit submask 120-C from the list 118-B of available submasks received from the registrar "ii". Accordingly, when acting as a registrar, the network member "vi" can provide to future enrollees a list 118-C of available submasks including the 6-bit submask 120-D.

A device "xi" that is not a member of an instance 100" of the ad hoc network (from here on referred to as the ad hoc network 100"), can detect the ad hoc network 100". As part of this detection, the mobile device "xi" can detect signals from any of the current network members that indicate that these devices can act as registrars to enroll the mobile device "xi" into the ad hoc network 100". The enrollee device "xi" can select one of the registrars with which to communicate about joining the ad hoc network 100" either randomly, or based on predefined criteria, as described above in connection with FIG. 1B. In this case, the enrollee "xi" can select the registrar "vi" from which to request enrollment into the ad hoc network 100".

Upon receipt of a request from the enrollee "xi" to enroll in the ad hoc network 100", the registrar "vi" can assign an address 116-C for the enrollee "xi", based on the designated 6-bit submask 120-C. In this case, the assigned address is IPxi=10.0.16.67, which corresponds to the bit value IPxi="00000101 00000000 00010000 01000011", which is a bit value within the submask 120-C. (The bit-range 13-18 of the bit value corresponds to the address range associated with the submask 120-C.) Subsequently, the registrar "vi" can transmit a response 110-C to the enrollee "xi". The response 110-C can be in the form of an M8 message in accordance with the WSC protocol. The response 110-C includes the registrar's address 112-C, in this case IPvi=10.0.0.67. Further, the response 110-C includes the subnet mask used by the ad hoc network 100", in this case 255.0.0.0. Furthermore, the response 110-C includes the enrollee's address 116-C, in this case IPxi=10.0.16.67, as assigned by the registrar "vi". Additionally, the response 110-C includes a list 118-C of available submasks, in this case including the submask 120-D.

From now on, the device "xi" also can take up the registrar role to perform registrations of future network members. Moreover, the registrar "xi" (and the other enrollees of registrars "vi", "vii") can register other future enrollees into the ad hoc network 100" by performing a fourth tier hierarchical address assignment as described below in connection with FIG. 1D. The device "vi" can continue to register other enrollees into the ad hoc network 100" by performing the third tier hierarchical address assignment as described above in reference to the enrolment of the device "xi". The registrar "vi" can register new network members until all 63 addresses in the subset of addresses associated with the designated 6-bit submask 120-C are assigned to new enrollees. In addition, the 63 enrollees, which may join the ad hoc network 100" via the third tier hierarchical address assignment performed by the registrar "vi", are part of a subnet "C" corresponding to a third hierarchical level of the ad hoc network 100". Similarly, enrollees (e.g., device "xii") which may join the ad hoc network 100" via the third tier hierarchical address assignment performed by the registrar "vii" are part of another subnet "C'" corresponding to the same third hierarchical level of the ad hoc network 100". There may be 62×63 subnets C, C', . . . at the third hierarchical level of the ad hoc network 100", one for each of the 63 network members that may be part of a subnet B, for each of the 62 subnets B that may be part of the subnet A.

Figure 1D:
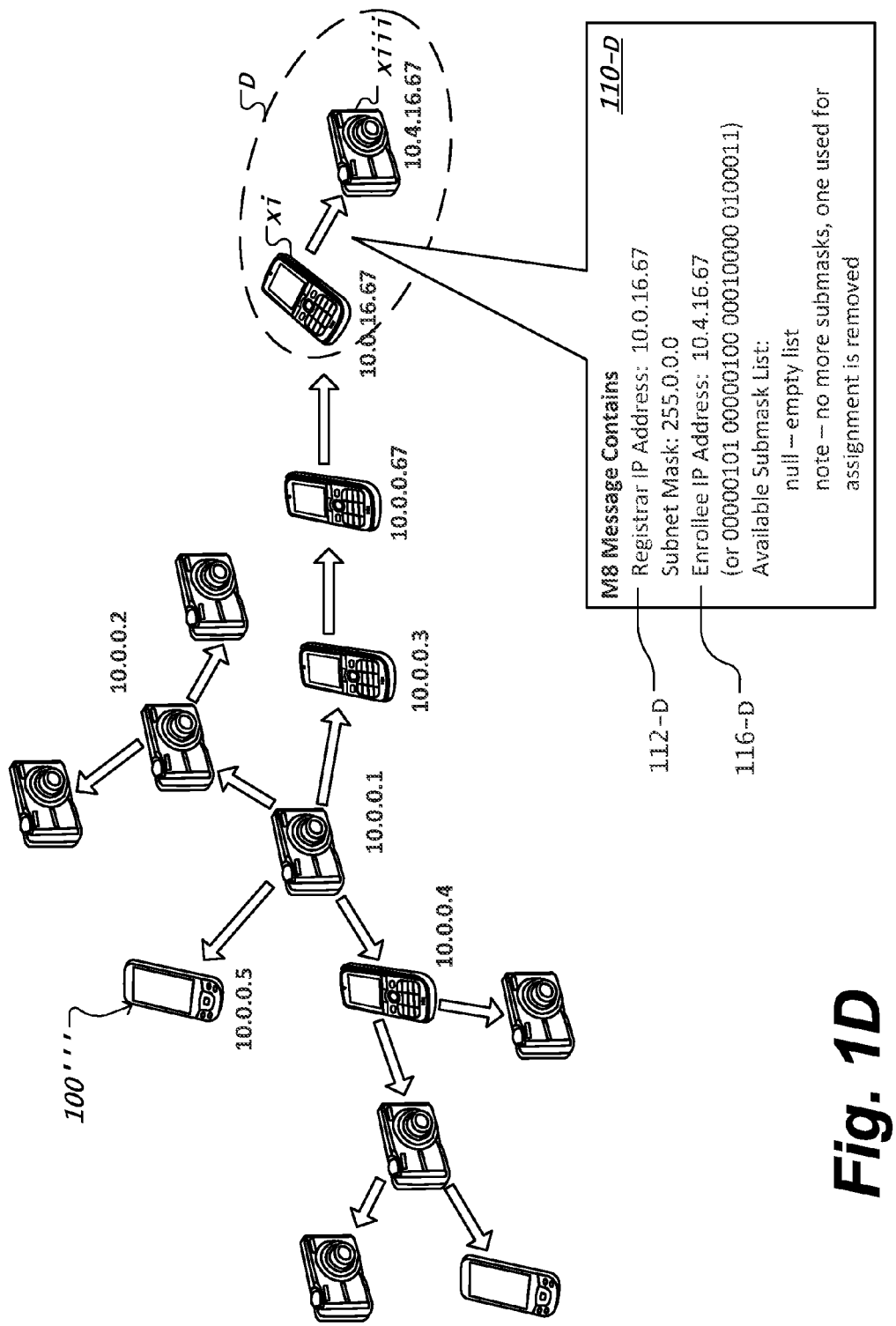

FIG. 1D shows an example of a fourth tier hierarchical address assignment. The new network member "xi" having an address 112-D can designate the 6-bit submask 120-D to define a subset of addresses that it can assign to future enrollees. Further, the network member "xi" can remove the 6-bit submask 120-D from the list 118-C of available submasks received from the registrar "vi". Accordingly, when acting as a registrar, the network member "xi" cannot provide to its enrollees a 6-bit submask to define a subset of IP addresses for the enrollees' future enrollees.

A device "xiii" that is not a member of an instance 100''' of the ad hoc network (from here on referred to as the ad hoc network 100'''), can detect the ad hoc network 100'''. As part of this detection, the mobile device "xiii" can detect signals from any of the current network members that indicate that these devices can act as registrars to enroll the mobile device "xiii" into the ad hoc network 100'''. The enrollee device "xiii" can select one of the registrars with which to communicate about joining the ad hoc network 100''' either randomly, or based on predefined criteria, as described above in connection with FIG. 1B. In this case, the enrollee "xiii" can select the registrar "xi" from which to request enrollment into the ad hoc network 100'''.

Upon receipt of a request from the enrollee "xiii" to enroll in the ad hoc network 100''', the registrar "xi" can assign an address 116-D for the enrollee "xiii", based on the designated 6-bit submask 120-D. In this case, the assigned address is IPxiii=10.4.16.67, which corresponds to the bit value IPxiii="00000101 00000100 00010000 01000011", which is a bit value within the submask 120-D. (The bit-range 19-24 of the bit value corresponds to the address range associated with the submask 120-D.) Subsequently, the registrar "xi" can transmit a response 110-D to the enrollee "xiii". The response 110-D can be in the form of an M8 message in accordance with the WSC protocol. The response 110-D includes the registrar's address 112-D, in this case IPxi=10.0.16.67. Further, the response 110-D includes the subnet mask used by the ad hoc network 100''', in this case 255.0.0.0. Furthermore, the response 110-D includes the enrollee's address 116-D, in this case IPxiii=10.4.16.67, as assigned by the registrar "xi". Note that no submask is included in the response 110-D at the fourth (and last) tier hierarchical address assignment.

The device "xi" can continue to register other enrollees into the ad hoc network 100''' by performing the fourth tier hierarchical address assignment as described above in reference to the enrolment of the device "xiii". The registrar "xi" can register new network members until all 63 addresses in the subset of addresses associated with the 6-bit submask 120-D are assigned to new enrollees. In addition, the 63 enrollees, which may join the ad hoc network 100''' via the fourth tier hierarchical address assignment performed by the registrar "xi", are part of a subnet "D" corresponding to a fourth (and last) hierarchical level of the ad hoc network 100'''. There may be 62×63×63 subnets D, . . . at the fourth hierarchical level of the ad hoc network 100''', one for each of the 63 network members that may be part of a subnet C, for each of the 63 subnets C that may be part of the subnet B, for each of the 62 subnets B that may be part of the subnet A.

Moreover, the registrar "xiii" (and the other enrollees of registrar "xi") cannot register other future enrollees into the ad hoc network 100''' as no submasks are being provided as part of the last tier of hierarchical address assignment, and thus no specified range of IP addresses from which to assign addresses to future enrollees. In some implementations, requests from devices that are not members of the ad hoc network 100''' can be ignored by the network members (e.g., "xiii") at the fourth (and last) hierarchical level of the ad hoc network 100'''. In other implementations, the network members (e.g., "xiii") at the fourth (and last) hierarchical level of the ad hoc network 100''' can turn off the registrar mode to become invisible to devices that attempt to enroll into the ad hoc network 100'''. In some other implementations, the network members (e.g., "xiii") at the fourth (and last) hierarchical level of the ad hoc network 100''' can notify enrollees that the former have no more addresses available for assignment to the latter.

Figure 2:
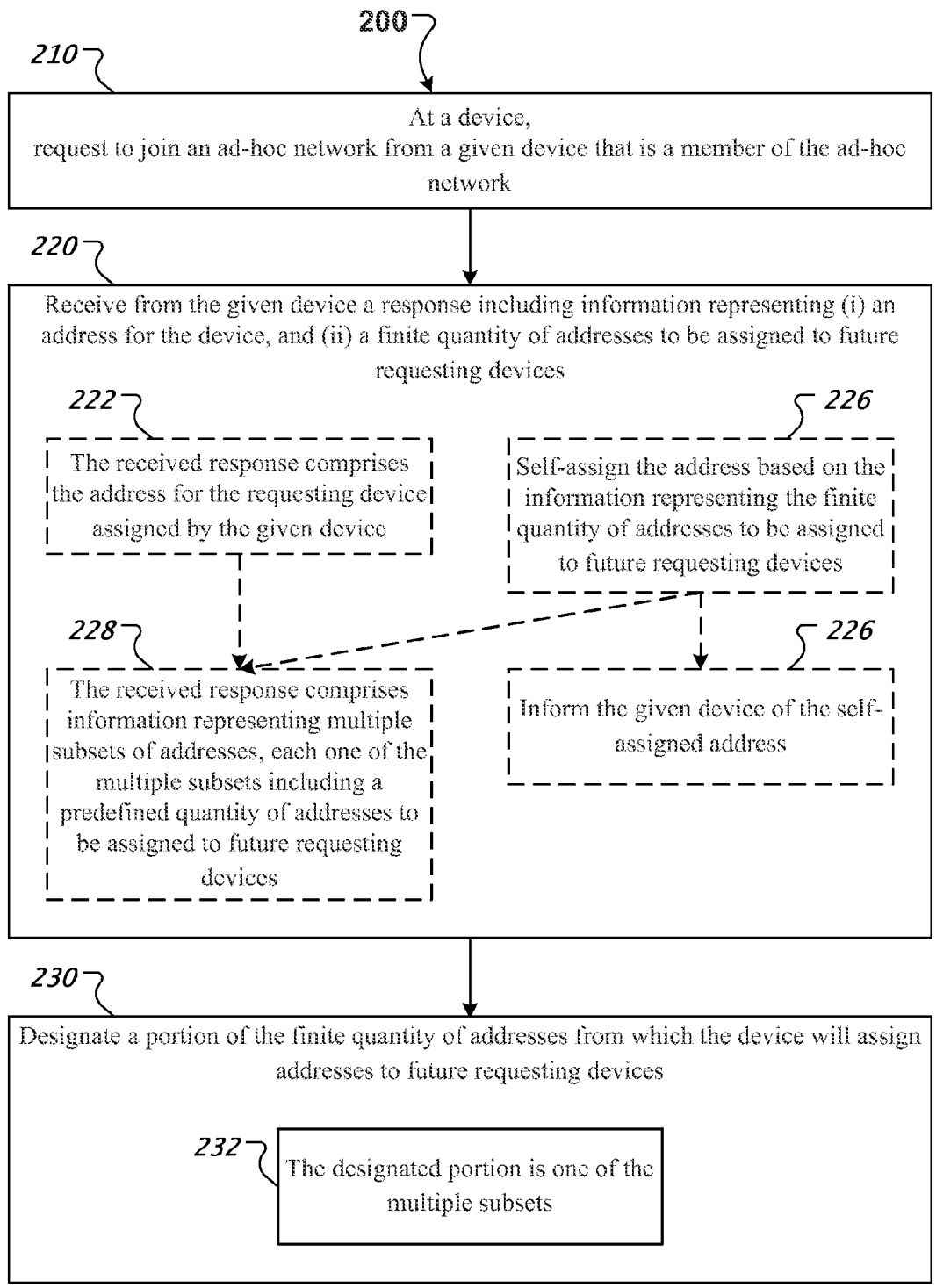
FIG. 2 shows an example of a process used by a device to enroll in an ad hoc network.

FIG. 2 shows an example of a process 200 used by a device to enroll in an ad hoc network. In the examples illustrated in FIGS. 1A-1D, the process 200 can be performed by enrollee devices "ii", "vi", xi" in communication with respective registrar members "i", "ii", "vi" of the mobile, wireless ad hoc network 100.

At 210, a device requests to join an ad hoc network from a given device that is a member of the ad hoc network. In some implementations, the device that is not a member of the ad hoc network can randomly select the given device of the ad hoc network from which to request to join the ad hoc network. For example, an enrollee can randomly select a registrar of the ad hoc network from among multiple network members that have emitted signals indicating their ability to act as registrars of the ad hoc network. In other implementations, the device that is not a member of the ad hoc network can select, based on predefined criteria, the given device of the ad hoc network from which to request to join the ad hoc network. An example of a selection criterion is a discovery order, such that a registrar of the ad hoc network is selected by an enrollee if the former was discovered by the latter within a predetermined quantity of most recently discovered network members. Another example of a selection criterion is signal quality, such that the registrar is selected by the enrollee if a signal received from the former meets or exceeds a predetermined quality metric, e.g., signal strength, bit error rate, etc. Another example of a selection criterion is how many addresses the registrar has available to assign relative to other registrars, such that the registrar is selected by the enrollee if a quantity of addresses available at the registrar exceeds respective quantities of addresses available at a predetermined number of other registrars.

At 220, the requesting device receives from the given device a response including information representing (I) an address for the requesting device, and (II) a finite quantity of addresses to be assigned to future requesting devices. For example, the addresses referenced in the received response from the given device are internet protocol version 4 (IPv4) addresses. In some implementations, at 222, the information representing the address for the requesting device included in the received response can include an address assigned by the given device for the requesting device. In other implementations, at 224, the information included in the received response can be used by the requesting device to assign its own address. For example, the requesting device can self-assign one of the finite quantity of addresses to be assigned to future requesting devices. Upon doing so, at 226, the requesting device can send a message to the given device, to inform the registrar of the self-assigned address.

At 228, the received response can include information representing multiple subsets of addresses, such that each one of the multiple subsets includes a predefined quantity of addresses to be assigned to future requesting devices. For each of the received multiple subsets, the predefined quantity of IPv4 addresses to be assigned to future requesting devices can be represented by a bit mask that has a quantity of bits equal to a quantity of bits of an IPv4 address. The bit mask has binary one values that define fixed bits of the predefined quantity of IP addresses, and binary zero values that define bits that are part of a range assignment of the predefined quantity of IP addresses. In the examples illustrated in FIGS. 1A-1D, the bit masks 120-A, 120-B, 120-C and 120-D have respective distinct groups of 6 binary zero values. In this manner, each one of the distinct groups of 6 binary zero values defines an address range corresponding to a subset of 63 IP addresses associated with the corresponding one of the bit masks 120-A, 120-B, 120-C and 120-D.

In some implementations, the response received from the given device can further include an address of the given device. In some implementations, the response received from the given device further includes a subnet mask associated with the ad hoc network.

At 230, the requesting device designates a portion of the finite quantity of addresses from which the device will assign addresses to future requesting devices. For example, the requesting device can designate, at 232, one of the multiple subsets of addresses, referenced by the received information in accordance with 228, to be a subset of addresses from which the device will assign addresses to future requesting devices. In this fashion, the received address assigned by the given device (or the self-assigned address) represents a hierarchy node for the finite quantity of addresses included in the designated subset to be assigned by the requesting device to future requesting devices. Further, the finite quantity of addresses included in the designated subset of addresses represents a single hierarchy level associated with the one of the received multiple subsets, and corresponds to a quantity of hierarchy branches equal to the finite quantity of addresses. In the examples illustrated in FIGS. 1A-1D, the addresses assigned by the registrars "i", "ii", "vi", "xi" represent nodes of the disclosed hierarchical address assignment, and correspond to respective origins of the subnets A, B, C and D. Additionally, the addresses that can be assigned to enrollees of any one from among the registrars "i", "ii", "vi", "xi" represent a single level of the disclosed hierarchical address assignment and correspond to a single subnet from among the A, B, C and D subnets of the ad hoc network.

Figure 3A:
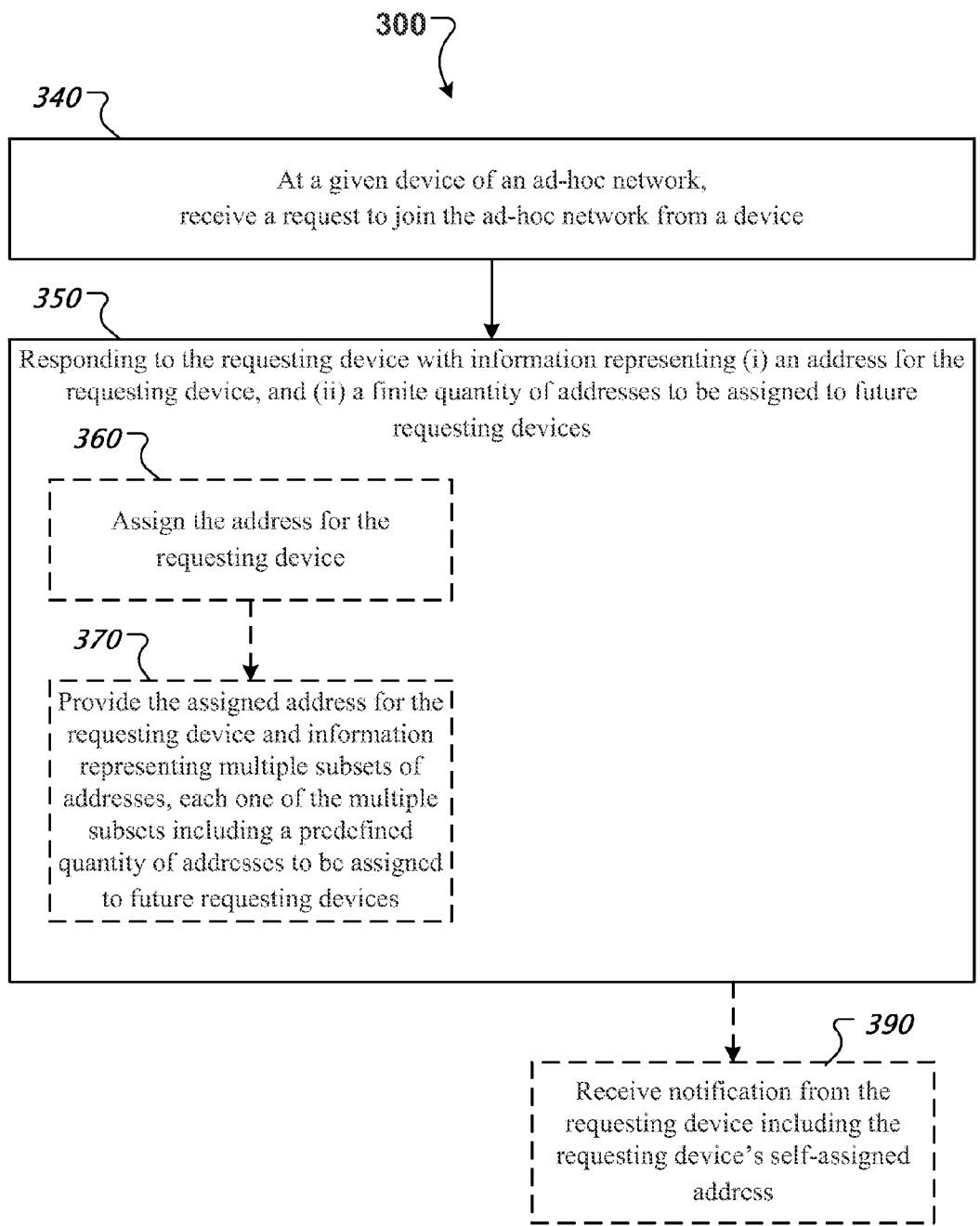
FIGS. 3A and 3B show aspects of an example of a process used by a member of an ad hoc network to register a new device to the ad hoc network.

FIG. 3A shows an example of a process 300 used by a member of an ad hoc network to register a new device to the ad hoc network. In the examples illustrated in FIGS. 1A-1D, the process 300 can be performed by network members "i", "ii", "vi" that are respectively selected by enrollee devices "ii", "vi", xi" to act as a registrars for the mobile, wireless ad hoc network.

At 340, a given device of an ad hoc network receives a request to join the ad hoc network from a device that is not a member of the ad hoc network. For example, the given device, acting as a registrar of the ad hoc network, can detect a signal emitted by the device, acting as an enrollee, which indicates that the latter requests to enroll in the ad hoc network. The received request can trigger initiation, by the registrar, of a registration process for the enrollee device.

At 350, the given device responds to the requesting device with information representing (I) an address for the requesting device, and (II) a finite quantity of addresses to be assigned to future requesting devices. The addresses from the finite quantity of addresses can be IPv4 addresses. As part of responding (at 350) to the request of the enrollee device, at 360, the given device can assign the address for the enrollee. Examples of address assignments by registrars to enrollees have been described above in connection with FIGS. 1A-1D. Also as part of responding (at 350) to the request of the enrollee device, at 370, the given device can provide the address assigned for the enrollee, and information representing multiple subsets of addresses. Each of the multiple subsets of addresses includes a predefined quantity of addresses to be assigned to future enrollees. Moreover, the predefined quantity of addresses to be assigned to future enrollees can be represented by a bit mask having a quantity of bits equal to a quantity of bits of an IPv4 address, such that binary one values of the bit mask define fixed bits of the predefined quantity of IPv4 addresses, and binary zero values of the bit mask define bits that are part of a range assignment of the predefined quantity of IPv4 addresses.

In other implementations, the assignment of the enrollee's address can be performed by the enrollee, e.g., at 224, as described above in connection with FIG. 2. In such cases, at 390, the given device can receive a notification from the requesting device that includes the requesting device's self-assigned address.

Figure 3B:
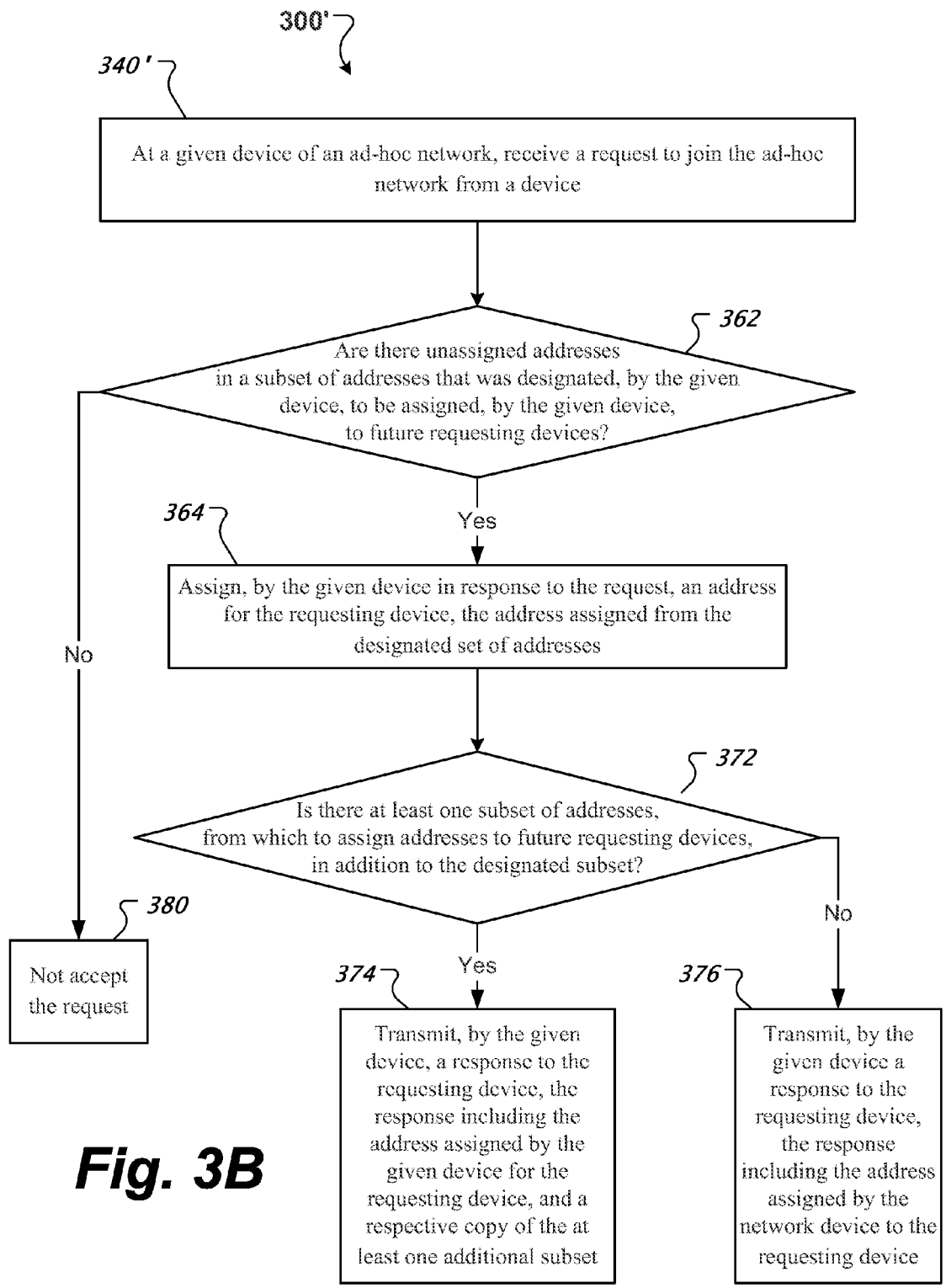

FIG. 3B shows another example of a process 300' used by a member of an ad hoc network to register a new device to the ad hoc network. In the examples illustrated in FIGS. 1A-1D, the process 300' can be performed by network members "i", "ii", "vi", "xi" that are respectively selected by enrollee devices "ii", "vi", xi", "xiii" to act as a registrars for the mobile, wireless ad hoc network. At 340', a given device of an ad hoc network receives a request to join the ad hoc network from a device that is not a member of the ad hoc network, as described above, at 340, in connection with FIG. 3A.

At 362, the given device determines, in response to the request received from the enrollee device, whether there is at least one unassigned address in a finite subset of addresses that was designated by the given device to be assigned, by the given device, to future requesting devices. The addresses from the designated finite subset of addresses can be IPv4 addresses. The designated finite subset of addresses can be represented by a bit mask having a quantity of bits equal to a quantity of bits of the IP addresses. The bit mask has binary one values that define fixed bits of the finite quantity of IP addresses, and binary zero values that define bits that are part of a range assignment of the finite quantity of IP addresses.

At 364, in response to determining (at 362) that there is at least one unassigned address in the designated finite subset, the given device assigns an unassigned address for the requesting device from the designated finite set of addresses. Assigning an address for an enrollee device can be a step of the registration protocol performed by a registrar network member. Enabling the enrollee to act as a registrar can be another step of the registration protocol performed by the registrar, as described below.

At 372, the given device determines whether there is at least one finite subset of addresses from which to assign addresses to future requesting devices, in addition to the designated finite subset. The addresses from the at least one additional finite subset of addresses also are IPv4 addresses. At 374, in response to determining (at 372) that there is at least one additional finite subset of addresses, the given device transmits a response to the requesting device including the address assigned by the device for the requesting device, and the at least one additional finite subset. In this manner, the enrollee can not only become a member of the ad hoc network, but also can act as a registrar of the ad hoc network to enroll future requesting devices. Examples of responses transmitted at 3374 correspond to the responses 110-A, 110-B and 110-C described above in connection with FIGS. 1A-1C.

The combination of operations performed at 340', 362, 364, 372 and 374 as part of the process 300' corresponds to an example implementation of the process 300 described above in connection with FIG. 3A.

Returning to FIG. 3B, at 376, in response to determining (at 372) that there is no additional finite subset of addresses, the given device transmits a response to the requesting device including the address assigned by the given device for the requesting device. In this manner, although the enrollee can become a member of the ad hoc network, it cannot also act as a registrar of the ad hoc network. Examples of responses transmitted at 375 correspond to the response 110-D described above in connection with FIG. 1D.

In some implementations a response transmitted, at either 374 or 376, by the given device to the requesting device further includes an address of the given device. In some implementations a response transmitted, at either 374 or 376, by the given device to the requesting device further includes a subnet mask associated with the ad hoc network.

At 380, in response to determining (at 362) that there is no unassigned address in the designated finite subset, the given device does not accept the request of the requesting device. Such situation can occur when the registrar device has already enrolled a number of network members equal to the number of addresses in the finite designated set of addresses. This situation also can occur when the given device is part of a subnet at the lowest hierarchy level of the ad hoc network. In such case, as described above in connection with FIG. 1D, the registrar that enrolled the given device has not provided to the given device, along with the assigned address, a finite set of addresses to be assigned by the given device to future enrollees. In some implementations, a registrar can be configured to passively not accept the request by simply ignoring the signal from an enrollee requesting to register into the ad hoc network. In other implementations, the registrar can be configured to actively not accept the request by informing the enrollee that the registrar has assigned all its available addresses.

Figure 4:
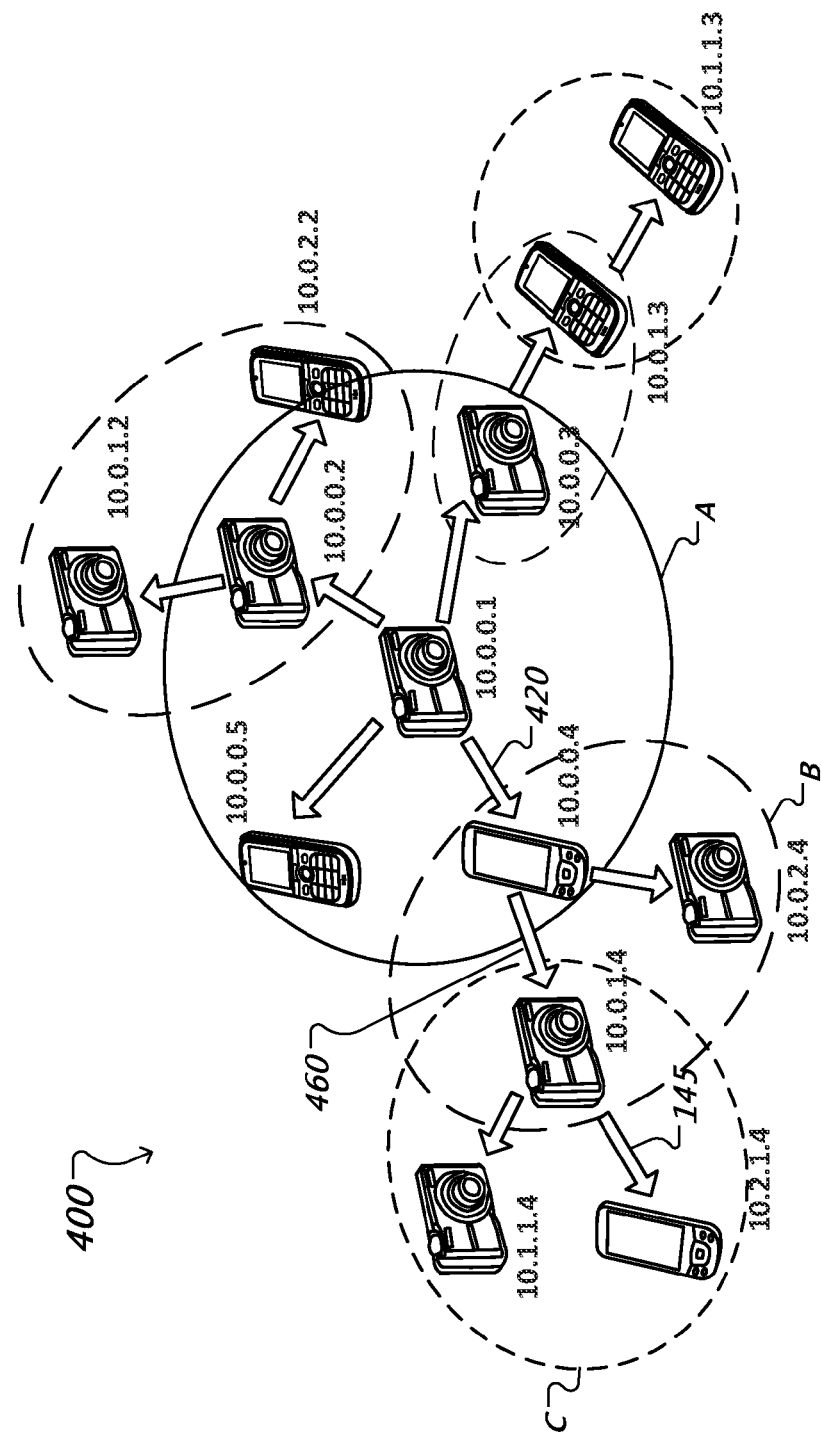
FIG. 4 shows an example of architecture for a mobile, wireless ad hoc network.

FIG. 4 shows an example of a hierarchical address assignment for a mobile, wireless ad hoc network 400. Addresses of members of the ad hoc network 400 can be assigned, for example, based on the processes 200 and 300 described above in connection with FIGS. 2 and 3, respectively.

Members of the ad hoc network 400 can be cellular telephones, smartphones, PDAs, mobile computers, digital cameras, media players or combinations of these devices. The members of the ad hoc network 400 can act as registrars and can assign addresses for enrollee devices, for example, in a 24 bit IPv4 address space denoted 10.0.0.0/24. In this example, every registrar can maintain a bit mask that defines a set of addresses that it may assign to enrollees. An additional list of bit masks is provided to each enrollee by the registrar when the latter assigns the enrollee an address. An enrollee then uses the first bit mask for its range of address assignment when the enrollee will act as a registrar. This bit mask is removed from the received list and the reduced list is then provided when the device acts as a registrar. When the list provided to an enrollee is empty or all addresses in a registrar's address range are assigned, the device cannot act as a registrar.

A bit mask can be constructed in a similar manner to a subnet mask. For example, binary one values of a bit mask represent fixed bits, and N binary zero values of the bit mask define bits that are part of the range of addresses available for assignment by a registrar that maintains the bit mask. A bit mask can be referred to as an N-bit mask based on the number N of binary zero values of the bit mask. The example of the hierarchical address assignment illustrated in FIG. 4 is based on three 8-bit masks: BM1=11111111 11111111 11111111 00000000; BM2=11111111 11111111 00000000 11111111; and BM3=11111111 00000000 11111111 11111111.

The number of addresses associated with an 8-bit mask is $2^8-1=255$. So, in FIG. 4, a registrar using any one of the 8-bit masks BM1, BM2 and BM3 can register 255 enrollees. Moreover, the assignment of addresses can be supported by additional fields carried in the WSC M8 messages in encrypted settings. The M8 messages, denoted in FIG. 4 by arrows, include the registrar address, the subnet mask, the assigned enrollee address, and the list of available 8-bit masks.

The device that originates the ad hoc network 400 maintains the 8-bit mask BM1 to define a set of addresses that it can assign to enrollees. In addition, this device has a self-assigned address 10.0.0.1. Subsequently, the registrar 10.0.0.1 can perform first tier hierarchical address assignments to enroll 254 new devices based on the subset of addresses associated with the 8-bit mask BM1. The network members enrolled by the registrar 10.0.0.1 form a subnet "A" corresponding to a first hierarchy level of the ad hoc network 400. For example, a device that was enrolled by the registrar 10.0.0.1 was assigned an address 10.0.0.4. In accordance to 222 of process 200 or 374 of process 300', the message 420 transmitted by the registrar 10.0.0.1 to the enrollee 10.0.0.4 includes the registrar's IP address: 10.0.0.1; the subnet mask: 255.0.0.0.0; an IP address assigned for the enrollee: 10.0.0.4; and a list of available 8-bit masks including BM2 and BM3.

In order to act as a registrar, the new network member 10.0.0.4 can designate the 8-bit mask BM2 to define a set of addresses that it may assign to enrollees. Subsequently, the registrar 10.0.0.4 can perform second tier hierarchical address assignments to enroll 255 new devices based on the subset of addresses associated with the 8-bit mask BM2. The network members enrolled by the registrar 10.0.0.4 form a subnet "B" corresponding to a second hierarchy level of the ad hoc network 400. For example, a device that was enrolled by the registrar 10.0.0.4 was assigned an address 10.0.1.4. In accordance to 220 of process 200 or 374 of process 300', the message 460 transmitted by the registrar 10.0.0.4 to the enrollee 10.0.1.4 includes the registrar's IP address: 10.0.0.4; the subnet mask: 255.0.0.0.0; an address assigned for the enrollee: 10.0.1.4; and a list of available 8-bit masks including BM3.

In order to act as a registrar, the new network member 10.0.1.4 can designate the 8-bit mask BM3 to define a set of IP addresses that it may assign to enrollees. Subsequently, the registrar 10.0.1.4 can perform third (and last) tier hierarchical address assignments to enroll 255 new devices based on the subset of addresses associated with the 8-bit mask BM3. The network members enrolled by the registrar 10.0.1.4 form a subnet "C" corresponding to a third (and last) hierarchy level of the ad hoc network 400. For example, a device that was enrolled by the registrar 10.0.1.4 was assigned an address 10.2.1.4. In accordance to 376 of process 300', the message 470 transmitted by the registrar 10.0.1.4 to the enrollee 10.2.1.4 includes the registrar's IP address: 10.0.1.4; the subnet mask: 255.0.0.0.0; and an address assigned for the enrollee: 10.2.1.4. The enrollee 10.2.1.4 cannot perform registrar functions because, as part of the last tier hierarchical address assignment the enrollee 10.2.1.4 is not provided with a bit mask by the registrar 10.0.1.4.

The disclosed systems and techniques used to hierarchically assign addresses in ad hoc networks are described above, in connection with FIGS. 1A-1D and 4, in the context of wireless, mobile ad hoc networks. Moreover, the described technologies can be applied to network environments that include wireless and wired connections. In addition, the systems and techniques described in this specification can be applied to fully wired network environments. An example of the latter network environment in which the disclosed technologies can be advantageously applied is a peer-to-peer (P2P) network running over tunnels. In such network environment, the peers can connect to the P2P network using virtual private network (VPN) tunneling. While the peers of the P2P network running over tunnels may have IP addresses that have been pre-assigned externally to the P2P network, local addresses used by the peers within the P2P network can be assigned and managed using the systems and techniques described in this specification.

In general, the technologies described in this specification can be used in an ad hoc network environment that (i) lacks complete connectivity at all times between network members, and (ii) uses a locally constrained address space from which peer addresses can be assigned. In such an ad hoc network, peer devices can be turned on and off (in a wired or wireless network) or can travel in and out of range of a portion of the ad hoc network (in a wireless network.)

Figure 5:
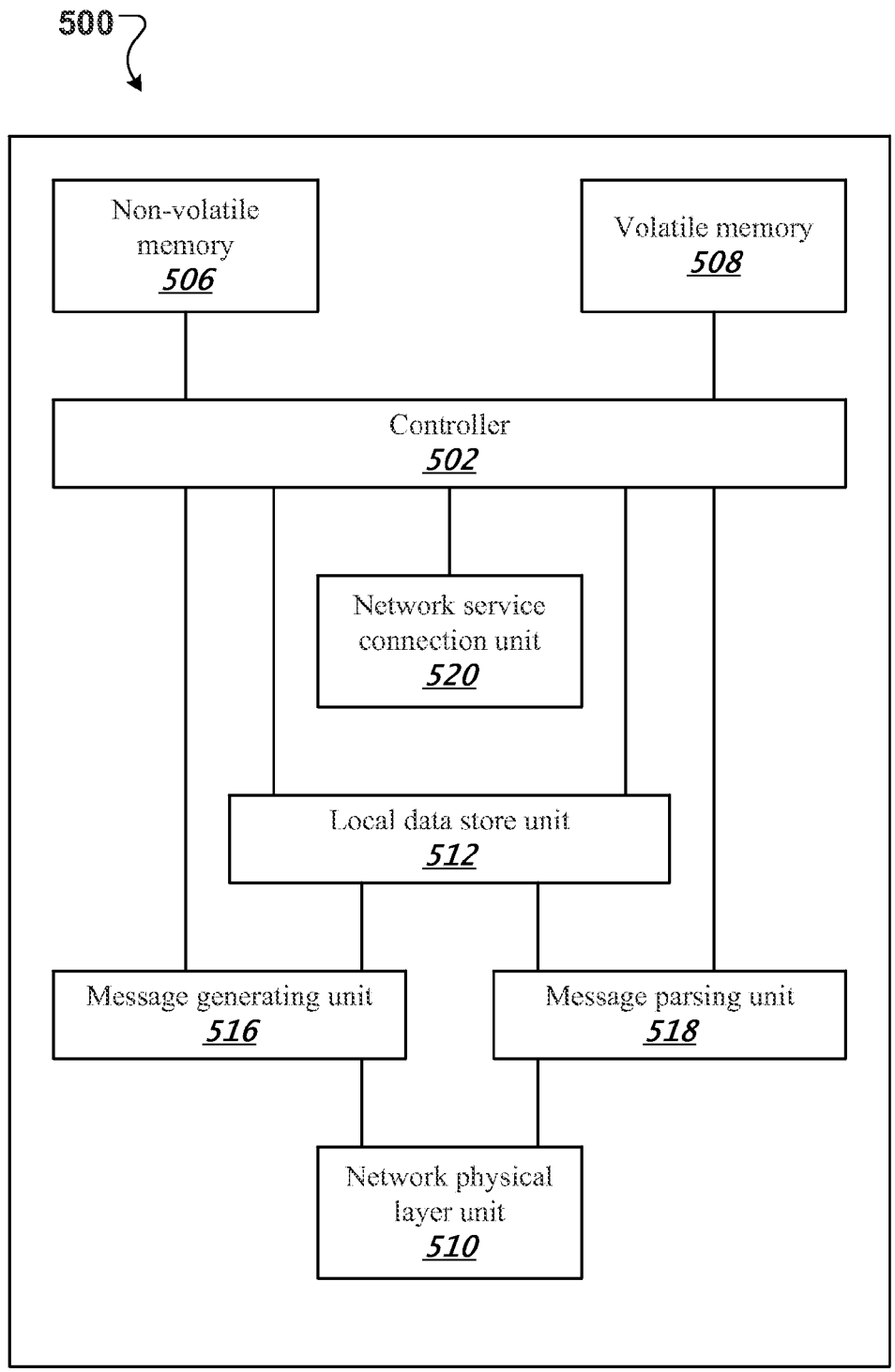
FIG. 5 shows an example of a device that supports assignment of network addresses, and more specifically hierarchical address assignment in mobile, wireless ad hoc networks.

FIG. 5 is a block level diagram of an example device that supports technologies relating generally to assignment of network addresses, and more specifically to hierarchical address assignment in ad hoc networks. As shown in FIG. 5, a device 500 can include at least a controller 502 in communication with non-volatile memory 506, volatile memory 508 and a network physical layer unit 510. In addition, controller 502 can communicate with a local data store unit 512, a message generating unit 516, a message parsing unit 518, and a network service connection unit 520.

The features included within the device 500 can be integrated, e.g., within one or more mobile electronic devices such as a laptop computer, cell phone, digital camera, media player, and the like. A mobile electronic device incorporating the device 500 can connect to an ad-hoc wireless network, as illustrated in FIGS. 1A-1D and 4. In this manner, the device 500 can provide connectivity between the mobile device in which the device 500 is incorporated and services provided via an available ad-hoc mode wireless network.

In some implementation, functions performed by network physical layer unit 510, e.g., layer 1, or physical layer, of the Open System Interconnection (OSI) model, can be performed, by a network interface card (NIC) added to an electronic device, or by a physical layer unit embedded with an electronic device's circuitry. Functions performed by controller 502, and subsequent layers of the OSI model, or other network communication model, can be performed by software executed, for example, by a general microprocessor in electronic devices such as a laptop computer, or can be executed, for example, by a separate processor in electronic devices such as smartphones, digital cameras, and media players.

Controller 502 can control processing related to the receipt and transmission of messages across network physical layer unit 510 in accordance with existing ad-hoc network standards, such as the ad-hoc network standard described in IEEE 802.11, but modified as described in detail in this specification, to support assignment of network addresses, and more specifically hierarchical address assignment in mobile, wireless ad hoc networks. Volatile memory 508 can allow the controller 502 to store program instructions in local memory for execution and to store and maintain temporary variables necessary for execution of the stored program instructions. Non-volatile memory 506 can allow the controller 502 to access and retrieve larger bodies of data and program instructions for later execution by the controller 502. Example processes executed as a result of the execution of such instructions are described in this specification with respect to FIGS. 2, 3A and 3B. Examples of larger bodies of data include information stored by the local data store unit 512.

Local data store unit 512 may build and maintain a local data store with information about detected peer devices from which messages, e.g., beacons, probe-requests, public action frames, and/or probe-responses, have been received by the device 500, as a result of the device 500 being a member of a common ad-hoc network, or as a result of the device 500 passively scanning and monitoring local message activities. The peer devices may be stand-alone devices or members of the same ad-hoc network to which the device 500 is connected.

For example, information maintained in the local data store unit 512 can include for each peer device within transmission range of the 500, a network address, a user-friendly name, and QUID for each service offered by the peer device. Data store entries can use a peer device's MAC address as a primary key in the local data store. The local data store can also be configured to include information about the peer device, e.g., the peer device's selected network address, user-friendly name, and universally unique identifier (UUID) for each service offered by the peer device. Information stored in the local data store by the local data store unit 512 can be received from the controller 502, and/or directly from the network service connection unit 520 or the message generating unit 516.

Message parsing unit 518 can receive a message from the network physical layer unit 510 and can parse the received message content to retrieve data that can be passed to the controller 502 and/or the local data store unit 512. For example, the message parsing unit 518 can parse a received message to obtain the MAC address and other information from the message header, and can parse and retrieve information contained within the message such as the information that supports assignment of network addresses, and more specifically hierarchical address assignment in mobile, wireless ad hoc networks, as addressed in greater detail below. Information retrieved from a received message can be passed to the controller 502 for further processing and decision making and/or portions of the retrieved information can be passed directly to the local data store unit 512 for generating updates to the local data store. Further, the controller 502 can instruct the local data store unit 512 to update information stored in the local data store based on peer device information received from the message parsing unit 518. An entry for a peer device within a device's local data store can expire and can be deleted from the device's local data store if a message, e.g., a beacon, probe-request, public action frame, and/or probe-response is not received from the corresponding peer device within a configurable time duration, e.g. 5 minutes.

Message generating unit 516 can, at the instruction of the controller 502, generate an ad-hoc message for transmission to devices within radio broadcast range. The generated message can be one of a beacon message, probe-request, public action frame, probe-response, or other message, as described in this specification. For example, upon being instructed by the controller 502 of the type of message to be generated, the message generating unit 516 can retrieve current device information and generate information containing, but not limited to, an ad hoc network identifier and a fingerprint of the network membership as locally stored at local data store unit 512 of the device. Further, based on the type of message to be generated, e.g., beacon message, probe-request, public action frame, probe-response, etc., the message generating unit 516 can receive additional information from the controller 502 and/or can request additional information from the local data store unit 512 as described in this specification. Once the message is generated, the message generating unit 516 can send the message to the network physical layer unit 510 for transmission.

Network service connection unit 520 can assist the controller 502 with locating a peer device that can be accessed by the device 500 via an ad-hoc network to obtain a desired service. For example, as described in this specification with respect to FIGS. 1A-1D and 4, the network service connection unit 520 can search local data store unit 512 for a desired service listed in association with a peer device. Upon locating a desired service, the network service connection unit 520 can provide the controller 502 with the network information required, e.g., MAC Address, basic service set identifier (BSSID), etc., for the controller 502 to establish an ad-hoc mode connection to the located peer device, thereby allowing the device 500 to access services available via a peer device connected to an ad-hoc network.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A method comprising:
at a device of an independent basic service set (IBSS) network,
receiving a request to register in the IBSS network from an enrollee device, and
responding to the enrollee with information representing (i) an address for the enrollee device, and (ii) a finite quantity of addresses to be assigned to future enrollee devices, wherein said responding to the enrollee includes
assigning, by the device, the address for the enrollee, and
providing the assigned address for the enrollee and information representing multiple subsets of addresses, each one of the multiple subsets including a predefined quantity of addresses to be assigned to future enrollees,
wherein said assigning the address for the enrollee device comprises
determining, by the device, that there is at least one available address in a subset of addresses from among the multiple subsets that was designated by the device to assign, by the device, addresses to future enrollee devices, and
in response to said determining that there is at least one available address in the designated subset, assigning, by the device, the address for the enrollee device from the designated subset; and
wherein said providing the assigned address for the enrollee and information representing multiple subset of addresses comprises
determining, by the device, that there is at least one subset of addresses from among the multiple subsets from which to assign addresses to future enrollee devices, in addition to the designated subset, and
transmitting, by the device, a response to the enrollee device including (i) the address assigned by the device for the enrollee device, and (ii) the at least one additional finite subset.

2. The method of claim 1, wherein addresses from the multiple subsets of addresses are internet protocol version 4 (IPv4) addresses.

3. The method of claim 2, wherein for each of the multiple subsets of addresses, the predefined quantity of addresses to be assigned to future enrollee devices is represented by a bit mask having a quantity of bits equal to a quantity of bits of an IPv4 address, such that binary one values of the bit mask define fixed bits of the predefined quantity of IPv4 addresses, and binary zero values of the bit mask define bits that are part of a range assignment of the predefined quantity of IPv4 addresses.

4. The method of claim 1, wherein the response transmitted to the enrollee device further includes an address of the device.

5. The method of claim 1, wherein the response transmitted to the enrollee device further includes a subnet mask associated with the IBSS network.

6. A device comprising:
a hardware processor; and
a memory storing instructions that when executed by the hardware processor causes the device to perform operations comprising
communicating with one or more mobile devices as members of an ad hoc network,
receiving a request to join the ad hoc network from a device that is not a member of the ad hoc network,
in response to the request, determining whether there is at least one unassigned address in a finite subset of addresses that was designated by the mobile device to assign, by the mobile device, addresses to future requesting devices,
in response to determining that there is at least one unassigned address in the designated finite subset, assigning an unassigned address for the requesting device from the designated finite set of addresses,
determining whether there is at least one finite subset of addresses from which to assign addresses to future requesting devices, in addition to the designated finite subset,
in response to determining that there is at least one additional finite subset of addresses, transmitting a response to the requesting device including the address assigned by the device for the requesting device, and information representing the at least one additional finite subset, and
in response to determining that there is no additional finite subset, transmitting a response to the requesting device including the address assigned by the device for the requesting device, and in response to determining that there is no unassigned address in the designated finite subset, not accepting the request.

7. The device of claim 6, wherein addresses from the finite subsets of addresses are internet protocol version 4 (IPv4) addresses.

8. The device of claim 7, wherein each one of the finite subsets of addresses is represented by a bit mask having a quantity of bits equal to a quantity of bits of an IPv4 address, such that binary one values of the bit mask define fixed bits of the IPv4 addresses of the one finite subset, and binary zero values of the bit mask define bits that are part of a range assignment of the IPv4 addresses of the one finite subset.

9. The device of claim 6, wherein the response transmitted to the requesting device further includes an address of the mobile device.

10. The device of claim 6, wherein the response transmitted to the requesting device further includes a subnet mask associated with the ad hoc network.

\* \* \* \* \*